United States Patent [19]

Sachdev et al.

[11] Patent Number: 5,773,561
[45] Date of Patent: Jun. 30, 1998

[54] POLYMER SEALANTS/ADHESIVES AND USE THEREOF IN ELECTRONIC PACKAGE ASSEMBLY

[75] Inventors: Krishna Gandhi Sachdev, Hopewell Junction; Michael Berger, Gardiner; Patrick A. Coico, Fishkill; Frank L. Pompeo, Middletown, all of N.Y.

[73] Assignee: International Business Machines Corporation, Armonk, N.Y.

[21] Appl. No.: 692,033

[22] Filed: Aug. 2, 1996

[51] Int. Cl.$^6$ ............................ C08G 73/10; C08G 69/26
[52] U.S. Cl. .............................. 528/353; 528/26; 528/38; 528/170; 528/171; 528/172; 528/173; 528/174; 528/176; 528/185; 528/188; 528/220; 528/229; 528/350; 428/458
[58] Field of Search .............................. 528/26, 38, 170, 528/171, 172, 173, 174, 176, 185, 188, 220, 229, 350, 353; 524/404, 430, 433; 428/458

[56] References Cited

U.S. PATENT DOCUMENTS 4,480,009  10/1984  Berger ...................................... 428/447
5,204,399  4/1993  Edelman .................................. 524/404

OTHER PUBLICATIONS

"A Novel Approach—Thermoplastic Die Attach Adhesive", by Lincoln Ying, M&T Chemical Inc. P. O. Box 1104, Rahway, New Jersey 07065, IEEE 1986, pp. 285–295.

*Primary Examiner*—P. Hampton-Hightower
*Attorney, Agent, or Firm*—DeLio & Peterson, LLC; John J. Tomaszewski; Aziz M. Ahsan

[57] ABSTRACT

The present invention relates generally to a new adhesive comprising a vinyl containing siloxane-containing polyimide for use in TSM capping of electronic package assemblies with adhesive capability of providing a seal band width of less than 4mm and even less than 2mm, solubility in non-toxic and environmentally safe solvents and durable adhesive properties and to a method for making the polyimides, a method for using the polyimides to make electronic packages and electronic packages made using the adhesive. The preferred vinyl-containing siloxane containing polyimide is a block type polymer containing blocks of a dianhydride-aromatic diamine oligomeric reaction product joined by non-vinyl/vinyl containing siloxane diamine forming links.

21 Claims, No Drawings

POLYMER SEALANTS/ADHESIVES AND USE THEREOF IN ELECTRONIC PACKAGE ASSEMBLY

BACKGROUND OF THE INVENTION

1. Field of the Invention

The present invention relates generally to siloxane polyimides as adhesives for use in electronic package assembly and, in particular, to special compositions and processes for TSM capping of electronic modules for protecting against mechanical damage and environmental effects on the electronic devices.

2. Description of Related Art

Organic polymeric adhesives commonly used for attachment of a protective cap in the assembly processes in non-hermetic electronic packages typically single chip modules (SCMs), and multi-chip modules (MCMs), in commercial applications are based on silicone elastomer chemistry and epoxies. For cycle time reduction to achieve low manufacturing cost and high product reliability, it is necessary that bonding materials be easily processable and require short cure time without requiring any special tooling, and must meet all the product reliability test criteria for performance in temperature-humidity and elevated temperature conditions.

The silicone adhesives are generally based on a hydrosilation reaction involving methyl hydro-dimethyl siloxane and vinyl terminated siloxane in the presence of a Pt catalyst. Since silicone elastomers are stress absorbing, these have been used successfully in bonding dissimilar materials even those having significant mismatch in thermal expansion such as aluminum which has a Thermal Coefficient of Expansion (or TCE) of about 23 ppm (parts per million) to ceramic with a TCE of 3–5 ppm.

Silicone elastomers, however, have several problems in that they are generally two component systems which are to be mixed shortly before use and the pot life of the mix is relatively short as it can result in viscosity changes during the use time effecting its dispense characteristics and adhesive thickness control. The mix typically requires an extra step of de-aeration before use to remove trapped gases and requires special tooling for the cure to maintain the desired pressure between the parts being bonded. A severe problem in using these materials for capping is that the smallest seal band width attainable is found to be 4 mm and greater due to the thixotropic nature of the material which tends to spread during application and cure. Occasional voids or defects in the polymer seal that are caused by outgassing of unpolymerized silicone species during cure result in blow-outs and product yield loss. Another problem is that the outgassed silicone species causes contamination of the bond pads and the device chip interfering with wire bonding and/or other metal-metal interconnections. In addition to these problems, the silicone chemistry is subject to cure inhibition with organometallic/organotin reagents, sulfur, amines etc. and thus requires a controlled environment for the necessary cure and consistency in polymer properties and adhesive performance.

The commercially available epoxy based adhesives are useful for bonding similar materials as in the attachment of a ceramic cap to a ceramic substrate but these are not suitable for bonding dissimilar materials such as an aluminum cap to a ceramic substrate due to TCE mismatch inducing thermal stresses at the interface resulting in bond failure during stress exposure. The epoxy adhesives also have relatively high and variable levels of ionics which is detrimental to package reliability, show higher moisture uptake, and lower thermal stability than polyimides. The flexible epoxies that are commercially available are designed for stress absorbing properties but these have some of the same problems as the common epoxies.

Advances in the electronics industry with the need for higher performance electronic products has resulted in a trend in the fabrication of larger size semiconductor chips with higher circuit density and decreasing package dimension, which dictates the need for narrowest possible seal band widths for protective cap attachment so that more of the TSM space can be utilized for bonding the chip and the passive components. With silicone based adhesives the smallest seal band obtainable is about 4 mm which is relatively large in terms of space requirement when fabricating, for example, 25 mm or 32 mm Ball Grid Arrays (BGAs) and it is desired that seal band widths of 2 mm and less are possible with an adhesive. In view of this limitation and others as described above in the case of commonly available adhesives, improved materials are required for compatibility with the increasing performance demands in the assembly processes for electronic packages.

Siloxane containing polyimides of varied chemistry and their applications for surface coatings in device passivation and as adhesives in electronic package assembly are well-known. U.S. Pat. No. 4,480,009 to Berger and assigned to M&T Chemicals Inc., discloses a large variety of siloxane polyimide compositions and gives a broad general teaching for the synthesis, polymer properties and many uses including applications as die-attach adhesives. This patent is incorporated herein by reference. An article by L. Ying of M&T Chemicals Inc. entitled "A Novel Approach . . . Thermo Plastic Die Attach Adhesive" introduces a new thermo plastic siloxane containing polyimide adhesive and is described as having enhanced adhesive properties for die bonding to a substrate.

U.S. Pat. No. 5,204,399 to Edelman discloses thermoplastic siloxane polyimides derived thermally conductive film adhesives for snap die bonding as it requires only seconds for chip attachment to copper lead frames. This patent is incorporated herein by reference. Specifically, the disclosed thermally conductive siloxane polyimide film adhesives are prepared from thermoplastic siloxane polyimides having a weight average molecular weight of at least about 100,000 which are synthesized from: 1) an aromatic dietherdianhydride; 2) a meta-substituted benzenediamine and 3) a polysiloxane diamine. The dianhydride content and total diamine content are present in an unequal molar ratio of diamine to dianhydride of 0.95–0.97:1 or 1.03–1.05:1. P-amino phenol is used as an end capping agent when the dianhydride is in excess and phthalic anhydride is used as the end capping agent when the diamine is in excess. The adhesives also contain a thermally conductive material to provide a conducting medium.

Bearing in mind the problems and deficiencies of the prior art, it is therefore an object of the present invention to provide improved adhesives for use in TSM capping of electronic package assembly with particular advantage of the adhesive capability providing a seal band width of less than 4 mm and preferably less than 2 mm.

Another object of the invention is to provide siloxane polyimide adhesives with solubility in non-toxic and environmentally safe solvents.

Another object of the invention is to provide siloxane-containing polyimide adhesive compositions having durable adhesive properties when used for bonding metal caps to ceramic substrate.

Still another object of the invention is to provide a method for using the improved siloxane polyimides as adhesives as a polymer seal between a metal or ceramic cap and substrate to provide protection of TSM from mechanical and environmental damage in electronic package assembly.

Yet another object of the invention is to provide electronic package assemblies made using the siloxane polyimide adhesive and application method thereof of the invention.

Other objects and advantages of the present invention will be apparent from the following description.

SUMMARY OF THE INVENTION

The above and other objects, which will be apparent to those skilled in the art, are achieved in the present invention which is directed in the first aspect to an adhesive comprising a siloxane-containing polyimide having a flexible polymer chain which is made by specially reacting an aromatic dietherdianhydride with a flexible aromatic diamine and a polysiloxane diamine, preferably a combination of polysiloxanediamines, of which at least one preferably contains a vinyl functionality and having a dianhydride to total diamine molar ratio of essentially 1:1, or having stiochiometric offset in the range from 0.95:1 to 1.05:1, preferably 0.97:1 to 1.03:1, in which case the excess reactant is capped with a monoanhydride or monoamine as conventionally used.

In another aspect of the invention, the above siloxane-modified polyimides may be blended with inorganic particulate conductive fillers and/or metallic fillers to provide thermally conductive or thermally and electrically conductive adhesives.

In a further aspect of the invention a method is provided for assembling electronic components using the siloxane polyimide adhesives of the invention to form a high performance polymer seal between a metal or a ceramic cap and a substrate for top side protection from mechanical or environmental damage.

Still a further aspect of the invention concerns siloxane containing polyimides that can be formulated in non-toxic and environmentally safe solvents.

DESCRIPTION OF THE PREFERRED EMBODIMENT(S)

Siloxane-containing polyimides having a flexible chain structure made according to this invention using a dietherdianhydride, a flexible aromatic diamine and preferably a combination of bis(amino) polysiloxanes, of which at least one has a vinyl functionality, are found to be superior to epoxies and silicone elastomeric adhesives and siloxane-containing polyimides described in the prior art. In non-hermetic electronic package assembly involving attachment of metal caps to a substrate as ceramic or ceramic caps to ceramic for top side protection requires polymer sealing materials or adhesives that are especially useful for narrow seal band widths preferably less than 4 mm, e.g., 2 mm or less, are desired.

Unlike the siloxane polyimides of the prior art that are soluble in diglyme or triglyme type solvents (use of which is restricted due to associated health hazards), the polyimides of this invention can be dissolved in relatively low boiling non-toxic and environmentally safe solvents such as ethoxyethyl propionate, gamma-butyrolactone, or mixtures thereof, in addition to commonly used solvents including NMP used for polyimides. Thermally and electrically conductive formulations of these siloxane-containing polyimides can be made by incorporating conductive fillers therein to provide superior performance as conductive adhesives as compared to filled silicone elastomer type polymers. The above adhesives are stress absorbing and thus withstand TCE mismatch between contacting materials, are easily processable requiring no special tooling, provide rapid bonding, are moisture resistant and have higher thermal stability than the silicone and epoxy based adhesives, and can be reworkable or non-reworkable depending on the cure temperature used.

This invention uses siloxane-containing polyimides as non-hermetic sealing materials for bonding a metal or ceramic cap to a substrate to protect the top side metal circuitry in electronic packaging assembly processes. This invention is especially concerned with flexible chain fully imidized siloxane-containing polyimides specially derived from aromatic dietherdianhydrides, flexible aromatic diamines, and one or more, e.g., two, aromatic bis(amino)-polysiloxanes, of which a vinyl functionality can be a part of the structural feature if a single siloxane diamine is used, or if two or more siloxane diamines are used at least one has a vinyl functionality, and their use as a high performance polymer seal with narrow seal band width applicability in bonding a metal or a ceramic cap to a substrate or an electronic module for protection of the top surface devices and other components from environmental and/or mechanical damage.

The siloxane-containing polyimides according to this invention have superior performance relative to silicone elastomer based adhesives and other siloxane-containing polyimides, particularly for protective lid sealing applications requiring component assembly using a reduced or narrow seal band. Void-free seals, higher thermal stability, no significant outgassing during cure and thus no contamination of the bonding metal, and overall ease of processing are other properties of the adhesives of the invention.

The polyimides can be used as solutions in ethoxy ethylpropionate or alternate solvents for liquid dispense, as pre-dried films or preforms, as bondable prepregs, and also as double sided adhesive tape fabricated using fully cured polyimide core film, preferably Upilex R, or an alternate carrier film which is coated with the siloxane-containing polyimide on both sides. It is also found that siloxane-containing polyimides according to this invention can be blended with conductive fillers to form electrically conductive or electrically insulative and thermally conductive formulations which can also be used as liquid dispense, prepregs, or partially dried preforms. Unlike adhesives based on silicone chemistry, these siloxane polyimides have little or no problem of pot life or inhibition by environmental contaminants.

The siloxane-containing polyimides of this invention are prepared by polymerizing, preferably dietherdianhydrides (structure I), aromatic diamines (structure II) and equilibrated bis(amino)polysiloxanes (structure III), using solution polymerization and imidization method. Alternate dianhydrides that can also be used in place of dietherdianhydrides or in combination with them are oxydiphthalic anhydrides, hexafluoro isoproplyidene diphthalic anhydride and the like.

In a modification of the siloxane polyimide synthesis according to this invention, it is preferred that two or more siloxane diamines be used of which the vinyl group carrying bis(amino) polysiloxane be added last to the reaction mixture after cooling to, e.g., about 100° C. to 120° C. as it is found that standard reaction methods result in polyimides with decreased solubility in the desired lower boiling non-toxic solvents.

The preferred dietherdianhydrides include 2,2 bis-(3,4-dicarboxyphenoxy)phenyl sulfide dianhydride, and the corresponding sulfone and ether, 2,2-bis(3,4-dicarboxyphenoxy)phenyl propane dianhydride. The diether dianhydrides in general are described in U.S. Pat. No. 5,204,399, supra, and may be represented by the following formula:

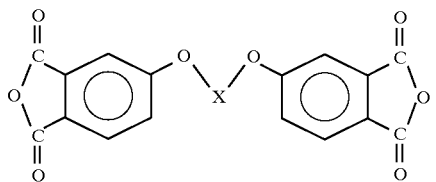

in which X is a substituted or unsubstituted group of the formula:

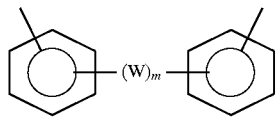

in which W is —O—, —S—, —SO$_2$—, —CO—, linear or branched alkylene or alkenylene having 1 to 8 carbon atoms or —(R)C(L)—, in which R and L can be the same or different lower alkyls having 1 to 8 carbons or aryl groups having 6 to 24 carbon atoms, and m is 0 or preferably 1.

The preferred aromatic diamines are meta-substituted benzenediamines and include 1,3-bis(m-aminophenoxy) benzene (APB), 3,3'-oxydianiline (3,3'ODA), 3,4'-oxydianiline(3,4'-ODA), 1,3—phenylene diamine (MPDA) and 2,2-bis(4-diamino phenoxyphenyl) propane and the like. The aromatic benzenediamines are likewise shown in U.S. Pat. No. 5,204,399, supra. Preferred aromatic benzenediamines may be represented by the following formula:

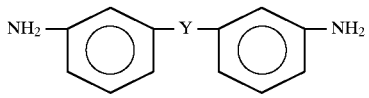

in which Y is selected from the group consisting of:

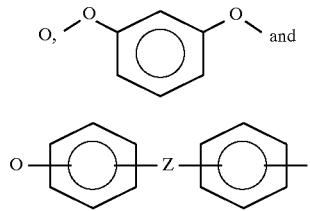

wherein Z is —O—, —S—, —SO$_2$—, —CO—, —SO— and lower alkylene having 1 to about 6 carbon atoms preferably H$_3$C—C—CH$_3$.

Bis(amino)polysiloxanes which include equilibrates of 1,3-bis(aminophenoxybutyl) disiloxane with octamethyl cyclotetrasiloxane and/or hexamethyl cyclotrisiloxane, trimethyl tri vinyl cyclotrisiloxane and/or tetramethyl tetravinyl cyclotetrasiloxane are preferred siloxane diamines. The synthesis methods for the siloxane containing diamines with aromatic amino group are described in British Patent No. 1,062,418 and are utilized in U.S. Pat. No. 4,480,009, for siloxane polyimide synthesis. Preferred siloxane diamines for the purpose of this invention are represented by the following formula:

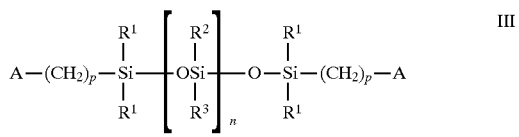

in which $R^1$, $R^2$ and $R^3$ are the same or different and are selected from the group consisting of alkyls having 1 to 8 carbons preferably, 1 carbon atom (CH$_3$), vinyl and mixtures thereof; n is 0 to 30, preferably 1 to 10; p is 1 to 4 preferably 3 to 4; and A is NH$_2$ or an amino phenoxy group. Preferably $R_1$ and $R_2$ are CH$_3$ and $R_3$ is vinyl.

In addition to the aromatic diamine siloxanes, aliphatic amino group containing siloxanes such as alpha, omega amino organo functional polydimethyl siloxanes available from Shin-Etsu Silicones of America and from Goldschmidt Chemical Corporation, Hopewell, Va. with varying molecular weight range can also be utilized.

The siloxane-containing polyimides of the invention are preferably synthesized by condensation polymerization and solution imidization by heating at an elevated temperature whereby the first step involves heating the dietherdianhydride with the aromatic diamine in a solvent such as chlorobenzene or dichlorobenzene at reflux with simultaneous removal of water formed during imidization to form a polymer typically an oligomeric product. The reaction mixture is then cooled to about 150° C. and the non-vinyl group containing siloxane diamine, if any, is added and heating continued for a few hours to form a copolymer. It is then cooled to about 100°–120° C. and the vinyl containing siloxane diamine added followed by heating.

Preferred siloxane polyimides according to this invention are comprised of about 30 to about 50 mole % of siloxane diamine of which about 5 to 15% (of the 30 to 50%) is the vinyl group containing siloxane diamine (preferably equilibrated) and about 50 to about 70 mole % flexible chain aromatic diamine preferably m-APB, or an alternate flexible aromatic diamine in conjunction with a dietherdianhydride. A mono anhydride, typically phthalic anhydride, methylnadic anhydride, or maleic anhydride or an amino compound such as p-aminophenol may be used for chain termination to control the molecular weight of the polymer. The reaction is typically carried out in dipolar aprotic solvents to form the siloxane polyimide block polymer which may be isolated by precipitation in methanol and dried under vacuum. It was found unexpectedly that introduction of preferably 5–15% (broadly up to 25% or more) of vinyl group containing siloxane based on the total siloxane diamine, results in a siloxane polyimide which has superior adhesion properties for lid attachment and improved solvent resistance as compared to conventional siloxane polyimides.

The final preferred polyimide product may be characterized as having blocks of the oligomeric (polymeric) reaction product resulting from the reaction of a molar excess of the dianhydride component (Formula I) with the aromatic diamine component (Formula II), which blocks are connected by siloxane diamine forming links. When the preferred sequential non-vinyl/vinyl containing siloxane diamine process is used, the connecting links will be firstly the non-vinyl siloxane component forming, in effect, a block polymer comprising the reaction product of aromatic dietherdianhydrides of Formula I and aromatic diamines of Formula II having non-vinyl siloxane connecting links. This block polymer is then connected with vinyl containing siloxane links. This may be described as follows with A being the block polymer resulting from the reaction of aromatic dietherdianhydrides and aromatic diamines of Formulas I and II; B being the non-vinyl siloxane diamine forming link; and C being the vinyl diamine siloxane forming links, with the length of the A-B block polymer varying depending on the reaction conditions:
-C-A-B-A-B-A-C-A-B-A-B-A-C-

The reaction product using a single polysiloxane diamine may also be represented by the following formula:

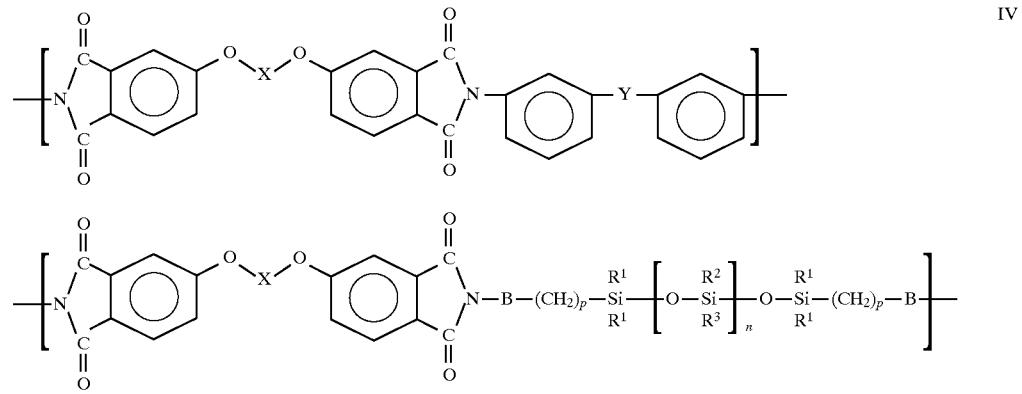

IV wherein X, Y, P, $R_1$, $R^2$, $R^3$ and n as defined above, B is a single bond or

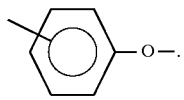

The fully imidized siloxane-containing polyimides of this invention can be dissolved in ethoxyethyl propionate, tetramethyl urea, gamma-butyrolactone, or NMP or mixtures thereof. For the purpose of this invention, it is preferred that the polyimides be soluble in a lower boiling solvent such as ethoxyethyl propionate so that most of the solvent can be removed at the pre-pregging stage which eliminates any possibility of voids formation due to solvent outgassing when the assembled parts are subjected to higher temperature in subsequent bonding process steps. These adhesives can be used as liquid dispense, polymer preforms, prepregs, or as a double sided adhesive tape for capping or protective lid attachment onto TSM side of ceramic packages using metal or ceramic lids to form highly reliable thermally stable void-free non-hermetic seals.

One aspect of this invention is the use of the siloxane containing polyimides in the bonding of a metal or ceramic lid (or cap) to a substrate according to which the polyimide solution is dispensed on the seal ring of the cap and partially dried/baked to remove solvent forming a prepreg that can be used immediately or it can be stored for months for later use. For bonding, the cap with adhesive prepreg is assembled with the substrate using a clamping device and subjected to 200°–240° C. for bonding in a preheated oven. In another aspect of this invention, the siloxane polyimide solution is cast into a film which is dried/baked at less than 100° C. to remove solvent to form an adhesive preform. For a polymer seal formation between a metal cap and ceramic substrate, the preform is cut into a desired dimension for the seal ring and placed on the cap seal ring, assembled with the substrate using a clamping device and subjected to elevated temperature in a preheated oven to effect bond formation. Yet another aspect of this invention is to use a double sided adhesive tape which is fabricated by forming about 0.5 to about 1.0 mil thick siloxane containing-polyimide adhesive coating on about 1 to about 2 mil thick fully cured flexible carrier film, preferably Upilex-R (Trade Mark of Ube' Industries) which is a fully cured polyimide film available from ICI America. The double sided adhesive tape can also be prepared by coating the siloxane polyimide adhesive on both sides of Kapton (DuPont Trade Mark for PMDA-ODA polyimide).

It has been found that with the above described process options the siloxane-containing polyimide adhesives of the invention may be employed for a seal band as narrow as 1.5 mm for attaching a metal cap, typically an Al cap to alumina ceramic (in comparison to a 4 mm band width generally possible with silicone based adhesives). The resulting bond maintains seal integrity under various product reliability stress exposures, typically, thermal shock at about −65 to about +150° C. (1000 cycles), 85° C./85% )temperature and humidity) T&H (168 hrs), and HAST (130° C./85% humidity). Similar performance is obtained with other metal caps such as in Cu cap sealing to glass ceramic. It has been found unexpectedly that if the bonding temperature for this polymer seal is maintained about 200° C. or somewhat lower, the seal can be reworked with a non-polar solvent while higher temperatures such as 220°–240° C. results in a non-reworkable seal.

Thermally conductive formulations with the siloxane-containing polyimides of the invention are obtained by the incorporation of thermally conductive fillers like alumina, silica, boron nitride, Al silicate, magnesium oxide, etc. It has been found that films cast from the filled siloxane containing-polyimides with even up to 75% by weight filler, remain flexible even after heating up to 230° C. while films made from commercially available filled siloxane-containing polyimides are brittle.

The following examples are intended to further illustrate the invention and are not intended to limit the scope of the invention in any manner.

EXAMPLE 1

Synthesis of Siloxane Polyimide A

A three neck flask equipped with a mechanical stirrer, soxhlet extractor equipped with 4A molecular sieves and a water condenser, and an adapter for $N_2$ purge was charged with 5.10 g 2,2-bis-(3,4-dicarboxyphenoxy)phenyl sulfide dianhydride (10 mmole), 1.54 g 1,3-bis-(m-aminophenoxy) benzene (APB)(7 mmole), 50 mg p-toluenesulfonic acid, and 100 g o-dichlorobenzene. The mixture was heated at reflux for 3 hr, then the temperature was lowered to a gentle reflux and 2.6 g (2.7 mmole) of siloxane diamine of molecular weight about 982 obtained by equilibration of 1,3-bis-(m-aminophenoxybutyl)tetramethyl disiloxane with octamethylcyclotetrasiloxane was added and heating continued at about 150° C. for another 4–5 hours and then the reaction mixture was cooled to about 120° C. followed by the addition of 0.35 g of a siloxane diamine of molecular weight about 1078 obtained by equilibration of tetravinyl-tetramethyl-cyclotetrasiloxane with 1,3-bis (m-amino phenoxybutyl) tetramethydisiloxane. After further heating at about 120° C. for 1 hour, the reaction solution was cooled to room temperature and the product precipitated by dropping slowly with vigorous stirring into methanol. The precipitated polyimide solids were collected by filtration, washed repeatedly with methanol and dried under vacuum.

EXAMPLE 2

Synthesis of Siloxane Polyimide B

Polyimide B was obtained by repeating the procedure of Example 1 using 2,2-bis-(3,4-dicarboxyphenoxy)phenyl propane dianhydride, APB, and the polymethyl and polymethyl vinyl siloxane diamines of Example 1.

EXAMPLE 3

Synthesis of Siloxane Polyimide C

Polyimide C was obtained using the same dianhydride, APB and siloxane diamine as in Example 1 but the dianhydride was added to the combined solution of APB and the bis(m-amino phenoxy butylpolydimethylsiloxane) instead of sequential addition of the diamines. The reaction mixture was heated near reflux for 6–7 hours, cooled to about 100°–120° C., and the vinyl group containing siloxane diamine of Example 1 was added followed by further heating and product solution using the method described in Example 1.

EXAMPLE 4

A 25–30% (w/w) solution of the polyimide of Example 1 in ethoxyethylpropionate was formed by agitating the mixture at about 60° to about 65° C. until the solids dissolved completely and the solution was stored in a refrigerator overnight to allow trapped bubbles to settle. Before use, the solution was allowed to come to room temperature and filtered through a 2–5 micron filter if necessary. The solution was then dispensed on metal caps typically A1 seal ring having 2 mm and 4 mm band width for capping a 32 mm alumina Ball Grid Array (BGA) package such that the polyimide solution essentially covered the entire width of the seal ring and no trapped bubbles or defects were found in the dispensed layer. This was placed on a hot plate at about 50° C., ramped to about 85° to about 90° C. in 15 min. and held at that temperature for about 30 min. to obtain an adhesive prepreg. For attachment to a substrate, the adhesive prepreg carrying cap was aligned and assembled with a substrate using a clamping device and heated at about 220° to about 240° C. for about 45 min. and cooled to at least about 80° to about 100° C. before removing the clamps. The assembly was tested for bubble leak at about 150° C. as well as subjected to standard product reliability stress exposures when both the 2 mm and the 4 mm seals passed all the tests with excellent performance showing no leak in the polyimide seal before and after thermal shock involving temperature excursions of about −65° C. to about 150° C. and 85° C./85% T&H exposure. For solvent resistance test, the assembly was immersed in hot xylene at 90° C. for 10 minutes under which condition the polymer seal showed no sign of attack.

It was further found that when the capping temperature with the prepreg adhesive was kept between 180°–200° C., it resulted in a reworkable polymer seal. In this case the cap could be removed by immersion in a non-polar solvent at about 80°–90° C.

Similar sealing performance of the siloxane polyimide of Example 1 was obtained in capping 44 mm and 64 mm modules with narrow (1.5–2 mm) and standard 4 mm seal band widths.

EXAMPLE 5

The polyimide solution of Example 4 was cast into a thin film on a Teflon sheet by doctor blade method, placed on a hot plate at about 50° C., ramped to about 85° to about 90° C. in about 15 min and held at that temperature for about 30 min to form a dry film or an adhesive preform of about 2.5 to about 3 mil thickness. The adhesive preform was sized to fit the dimension of the seal ring and used for bonding, A1 cap to a ceramic module by placing between the seal ring and the substrate, assembling with clamp pressure, heating the assembly in a preheated oven at about 200° to about 240° C. for about 45 min under $N_2$, cooling to at least 80°–100° C. before removing from the oven and removing the clamps. Seal integrity tests that involved bubble leak test, thermal shock by −650° to 150° C., and 85°/85% T&H exposure showed excellent performance results similar to the solution dispense and prepreg method used in Example 4 with both the 2 mm and 4 mm seal band width.

EXAMPLE 6

A double sided adhesive tape was made by spin coating the siloxane polyimide solution of Example 4 on a 1 and 2 mil thick Upilex-R film (commercially available) that was secured on a glass plate, drying or partially removing solvent by baking for about 20 min at about 90° C., allowing to cool to room temperature and applying the siloxane polyimide coating on the reverse side and again subjecting to about a 30 min. bake at about 90° C. to about 95° C. to form about 0.5 to about 0.8 mil thick adhesive film on each side of the Upilex-R film forming a double sided adhesive tape. This adhesive tape was used for bonding an A1 cap to ceramic and also a ceramic cap to ceramic substrate similar to the method described in Example 5 and provided a void-free durable seal which maintained its integrity under all the standard product reliability stress environment tests.

EXAMPLE 7

A thermally conductive version of polyimide A was formed by dispersing amorphous silica into the polyimide solution of Example 4 to obtain a homogenous dispersion with a w/w ratio of about 65:35 of filler: siloxane-containing polyimide. This was used for lid sealing by liquid dispense and as a preform similar to the methods described in Examples 4 and 5.

COMPARATIVE EXAMPLE

Commercially available siloxane-containing polyimides were also tested as adhesives for A1 cap attachment to alumina ceramic substrate. These polyimides have relatively low viscosity and are found to spread when applied on the seal band thus increasing the seal width and also causing problem of polymer flow toward the device cavity area. Also for obtaining adequate adhesive thickness, it was found necessary to apply multiple coats on the seal ring using partial bake in-between coating in order to bond Al cap to a ceramic module with seal band width of 4 mm or greater. These materials were not found suitable for narrow seal band width. Also, it is found that polymer seal formed using these polyimides is readily attacked by hot xylene.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A composition curable to form a siloxane-containing polyimide adhesive comprising:
   an aromatic dietherdianhydride;
   a flexible aromatic diamine; and
   a polysiloxane diamine having a vinyl group as part of the structure, the composition having a dianhydride to total diamine molar ratio of about 0.95:1 to 1.05:1 and in which the reactant in molar excess is capped with a monoanhydride or monoamine compound.

2. The composition of claim 1 wherein one or more polysiloxane diamine components is used, at least one of which has a vinyl group.

3. The composition of claim 2 wherein the flexible aromatic diamine is a meta-substituted benzenediamine.

4. The composition of claim 3 wherein the components of the composition are:
   an aromatic dietherdianhydride having the formula:

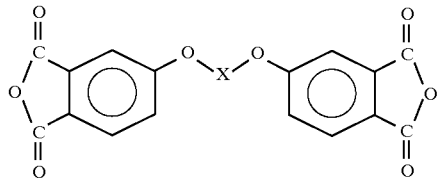

I in which X is a substituted or unsubstituted group of the formula:

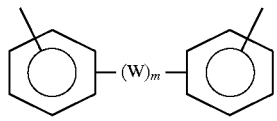

in which W is —O—, —S—, —SO$_2$, —CO—, linear or branched alkylene or alkenylene having 1 to 8 carbon atoms or —(R)C(L)—, in which R and L can be the same or different lower alkyls having 1 to 8 carbons or aryl groups having 6 to 24 carbon atoms, and m is 1;

a meta-substituted benzenediamine having the formula:

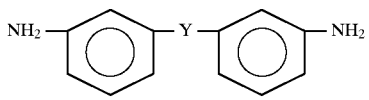

II in which Y is selected from the group consisting of:

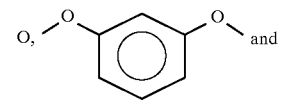

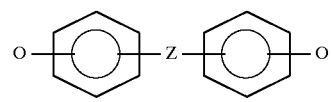

wherein Z is —O—, —S—, —SO$_2$-, —CO—, —SO— and lower alkylene having 1 to about 6 carbon atoms;
a polysiloxane having the formula:

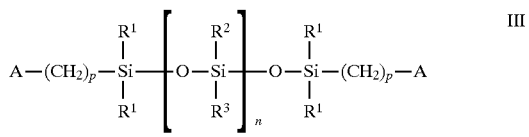

III in which R$^1$, R$^2$ and R$^3$ are the same or different and are selected from the group consisting of alkyls having 1 to 8 carbons and vinyl; n is 0 to 30; p is 3 to 4; and A is NH$_2$ or amino phenoxy group.

5. A siloxane containing polyimide for use as an adhesive made by polymerizing the composition of claim 1.

6. The polyimide of claim 5 made by a polymerization process comprising:
   heating a molar excess of the dietherdianhydride and aromatic diamine to form an oligomeric product;
   adding the polysiloxane diamine to the oligomeric product and heating the mixture to form the polyimide.

7. The polyimide of claim 6 wherein one or more polysiloxane diamines are reacted including a non-vinyl group containing polysiloxane diamine made by a polymerization process comprising:
   adding the non-vinyl group containing polysiloxane diamine to the oligomeric product and heating the mixture to react the oligomeric product and polysiloxane diamine; and
   adding the vinyl group containing polysiloxane diamine to the reaction product of the oligomeric product and non-vinyl group containing diamine and heating the mixture to react the reaction product and vinyl group containing polysiloxane diamine to form the polyimide.

8. The polyimide of claim 7 wherein the vinyl group containing polysiloxane is added last to the reaction mixture at a lower temperature.

9. The polyimide of claim 8 made by reacting the composition of claim 4.

10. A method for making a siloxane containing polyimide for use as an adhesive comprising:
    heating a molar excess of dietherdianhydride and a flexible aromatic diamine to form an oligomeric product;
    adding a polysiloxane diamine to the oligomeric product and heating the mixture to form the polyimide.

11. The method of claim 10 wherein one or more polysiloxane diamines are reacted including a non-vinyl group and vinyl group containing polysiloxane diamine comprising:
    adding the non-vinyl group polysiloxane diamine to the oligomeric product and heating the mixture to form a reaction product;
    adding the vinyl group containing polysiloxane diamine to the reaction product and heating the mixture to react the reaction product and vinyl group containing polysiloxane diamine to form the polyimide.

12. The method of claim 10 wherein the polysiloxane diamine has a vinyl group as part of the structure.

13. The method of claim 10 wherein the components to be reacted are:

an aromatic dietherdianhydride having the formula:

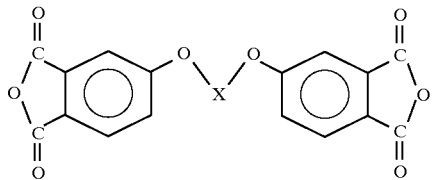

in which X is a substituted or unsubstituted group of the formula:

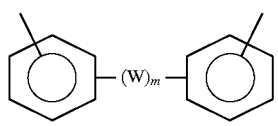

in which W is —O—, —S—, —SO$_2$, —CO—,linear or branched alkylene or alkenylene having 1 to 8 carbon atoms or —(R)C(L)—, in which R and L can be the same or different lower alkyls having 1 to 8 carbons or aryl groups having 6 to 24 carbon atoms, and m is 1;

a meta-substituted benzenediamine having the formula:

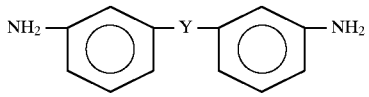

in which Y is selected from the group consisting of:

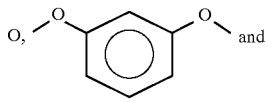

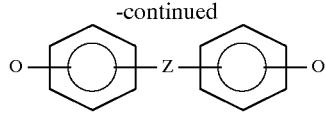

wherein Z is —O—, —S—, —SO$_2$—, —CO—, —SO—and lower alkylene having 1 to about 6 carbon atoms;

a polysiloxane having the formula:

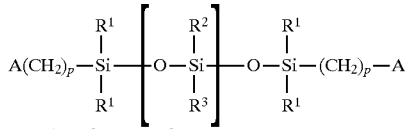

in which R$^1$, R$^2$ and R$^3$ are the same or different and are selected from the group consisting of alkyls having 1 to 8 carbons and vinyl; n is 0 to 30; p is 3 to 4; and A is NH$_2$ or amino phenoxy.

14. A method for making a siloxane containing polyimide for use as an adhesive comprising:

heating a molar excess of dietherdianhydride with a flexible aromatic diamine and a polysiloxane diamine to form a reaction product;

adding a vinyl group containing siloxane to the above reaction product and heating the mixture to form the polyimide.

15. A siloxane containing polyimide made by the method of claim 10.

16. A siloxane containing polyimide made by the method of claim 13.

17. A method for top surface metallurgy capping of electronic modules wherein a protective cap is attached to the electronic module using the adhesive composition made by the method of claim 10.

18. The method of claim 17 wherein the protective cap is metal and the electronic module is ceramic.

19. The method of claim 18 wherein the metal is aluminum or copper.

20. The method of claim 19 wherein the adhesive composition is made by the method of claim 11.

21. The method of claim 19 wherein a seal band width of the adhesive of less than about 2 mm is used.

\* \* \* \* \*

UNITED STATES PATENT AND TRADEMARK OFFICE
CERTIFICATE OF CORRECTION

PATENT NO. : 5,773,561
DATED : June 30, 1998
INVENTOR(S) : Krishna Gandhi Sachdev, Michael Berger, Patrick A. Coico, Frank L. Pompeo It is certified that error appears in the above-identified patent and that said Letters Patent is hereby corrected as shown below:

Column 10, line 30, "-650°" should be "-65°".

Signed and Sealed this

Twenty-second Day of September, 1998

BRUCE LEHMAN

*Attest:*

*Attesting Officer*         *Commissioner of Patents and Trademarks*